Aug. 31, 1954   W. P. OEHLER ET AL   2,687,682
PRESS WHEEL FOR PLANTERS
Filed April 5, 1951

INVENTORS.
WILLIAM P. OEHLER
ARTHUR J. IMMESOETE
BY
Roger C. Johnson
ATTORNEY

Patented Aug. 31, 1954

2,687,682

UNITED STATES PATENT OFFICE 2,687,682

PRESS WHEEL FOR PLANTERS

William P. Oehler and Arthur J. Immesoete, Moline, Ill., assignors to Deere & Company, Moline, Ill., a corporation of Illinois Application April 5, 1951, Serial No. 219,486

6 Claims. (Cl. 97—56)

The present invention relates generally to agricultural implements and more particularly to press wheels which are provided for use behind planter furrow openers or the like for the dual purpose of controlling the planting depth and firming the soil about the seed so as to form a fairly low ridge of compressed soil over the seed row.

The object and general nature of the present invention is the provision of a new and improved press wheel for planters and the like in which the ground-engaging tread of the press wheel is formed entirely by a resiliently flexible endless band of rubber or rubber-like material supported only at its opposite marginal edge portions, leaving the intermediate portions of the resilient band to flex radially inwardly and outwardly as the wheel rolls along the ground. An important feature of the present invention is the provision of a press wheel of the type in which provision is made for eliminating substantially all soil that falls onto the inner face of the flexible rim, so that there is no tendency for soil to build up between the flexible tread of the wheel and any adjacent supporting members. Another feature of the present invention is the provision of a press wheel of the type mentioned above, in which provision is made for securing the desired amount of axially acting tension in the flexible tread portion, whereby the latter may flex radially inwardly an amount sufficient to form the desired ridge of soil above the seed but without causing the flexible tread portions to be pressed bodily against any of the supporting elements of the wheel.

A further feature of the present invention is the provision of a press wheel having a solid or continuous disk-like web portion, forming thereby a spokeless construction, in which there is no tendency for cornstalks or the like to become entangled in the wheel and prevent its rotation.

An additional feature of this invention is the provision of a press wheel having a resiliently flexible tread portion supported on two axially spaced apart ring members that, in turn, are carried on a wheel web, with means for connecting the parts together which materially facilitate the ease by which the parts may be assembled during manufacture.

These and other objects and advantages of the present invention will be apparent to those skilled in the art after a consideration of the following detailed description, taken in conjunction with the accompanying drawings, in which.

Figure 1:
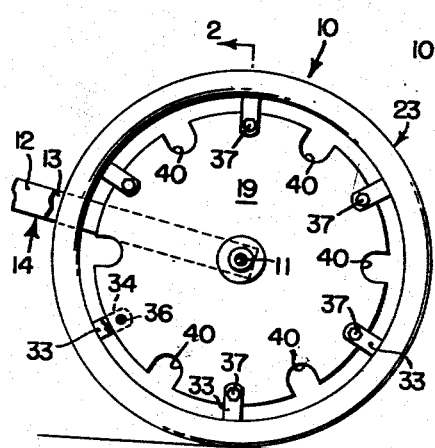
Figure 1 is a side view of a planter press wheel construction, in which the principles of the present invention have been incorporated.

The press wheel of the present invention is indicated in its entirety by the reference numeral 10 and is shown as mounted for rotation on suitable axle means 11 carried between the rear end portions of a pair of frame bars 12 and 13 which constitute the main portion of a press wheel frame connected in any suitable way with the planter, preferably directly to the furrow-opening runner behind which the press wheel 10 is adapted to operate.

The press wheel 10 comprises a wheel hub 17 having an abutment portion 18 against which a flat disk 19, forming the main supporting web of the wheel, is adapted to bear, the web 19 being apertured centrally, as at 21, to fit against the abutment 18, being held in place by a lock nut 22 threaded onto the adjacent portion of the wheel hub. The disk 19 is generally circular and has a diameter only slightly less than the diameter of the wheel itself.

Figure 2:
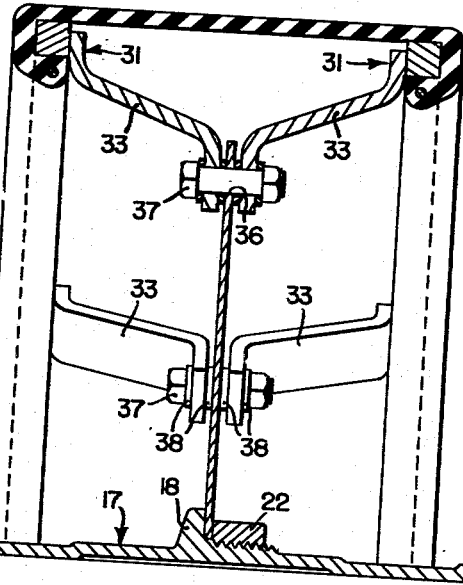
Figure 2 is an enlarged sectional view taken generally along the line 2—2 of Figure 1.

The ground-engaging portion of the press wheel 10 comprises a generally cylindrical annular tread member 23, preferably formed of molded rubber or rubber-like material and comprises a resiliently flexible, cylindrical endless band 24 having at its marginal edges a radially inturned and axially inwardly extending flange section 25 reenforced by a non-extensible ring-like element 26, preferably formed as a steel cable or ring. The flange 26 has a radially outwardly facing wall portion 27, generally cylindrical and spaced radially from the inner surface 28 of the resiliently flexible intermediate tread section 24. The radially opposed, generally concentric surfaces 27 and 28, together with the laterally inwardly facing end wall 29, form a ring-receiving recess or socket S particularly adapted to receive a ring member, such as the one indicated by the reference numeral 30, which is square or rectangular in cross section. The ring members 30 form the principal portions of a pair of separable rim sections, each indicated in its entirety by the reference numeral 31. In addition to the associated ring member 30, each separable rim section 31 includes a plurality, such as six, of axially and radially inwardly extending lugs 33, the outer portions of which are welded to the inner face of the associated ring 30. The inner end of each of the lugs 33 is formed as an apertured straight portion 34. The peripheral portions of the wheel web 19 are apertured, as at 36, so as to receive clamping bolts 37 that are passed through the holes in the lug ends 34 for the purpose of holding the wheel parts together. At one or both sides of the wheel web 19, one or more washers are disposed over the associated bolts 37 and between the lug ends 34 so as to hold the wheel rings 29 at the required axial spacing so as to give or impart the required tension, in an axial direction, to the resilient tread section 24. As will be seen from Figure 2, the lugs 33 are so shaped that there is ample clearance between them and the resilient tread section 24 when the latter is bowed upwardly when it passes over the seed row, the upward or radially inwardly bowing or flexing of the rubber tread section 24, indicated at 39 in Figure 2, serving to form the desired compressed ridge of soil over the seed furrow. At the same time, the flexing of the tread section 24 as the same passes into and out of the zone of contact with the ground effectively sheds any adhering soil from the rim section, whereby the need for scrapers and the like is entirely eliminated.

Figure 3:
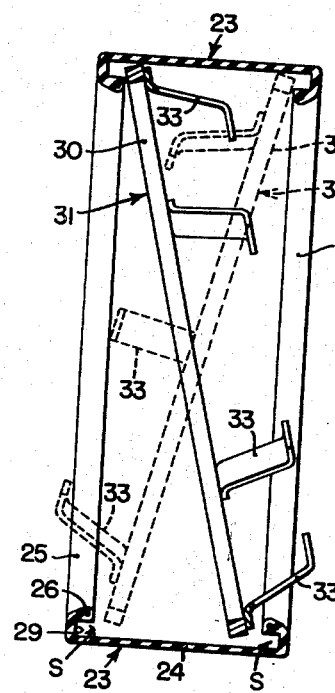
Figure 3 is a fragmentary view illustrating the manner in which the wheel rings may readily be assembled within the resilient tread section of the press wheel.

The press wheel as described above may readily be assembled. Referring first to Figure 3, one of the separable rim sections 31 may first be placed inside the tread section 23 by slightly ovalizing the latter and then forcing the ring 30 into the interior between the flanges 25, the position of the left-hand rim section 31 just after insertion into the tread section 23 being indicated in full lines in Figure 3. The aforesaid rim section 31 may then be straightened relative to the tread section 23 and brought into the position shown in Figure 2. Next, the other or right-hand rim section 31 may be inserted into the tread section 23 from the other side in substantially the same way, by first disposing the two rim sections 31 at this time so that the lugs 33 do not register but are displaced one relative to the other, as shown in Figure 3, and then ovalizing that side of the tread section 23 and forcing the ring 30, together with the lugs 33 secured thereto, into substantially the position shown in dotted lines in Figure 3, after which the second rim section 31 may then be straightened and the ring 30 brought into the associated socket S. Next, one rim section 31 is rotated relative to the other so as to bring the respective lugs 33, particularly the apertures in the ends 34 thereof, into aligned or registered relation. Intermediate the openings 36, the wheel disk 19 has a plurality of notches 40, so that by first turning the disk 19 to bring the notches 40 into a position to clear the near lug ends 34 the wheel disk 19 may be brought into the plane that passes between the cooperating lug ends 34. Then by turning the disk 19, the openings 36 may be brought into alignment with the openings in the lug ends 34. By next inserting the bolts 37, together with the number of washers 38 necessary to impart the desired tension to the central portions of the tread section, and then tightening the bolts 37, the wheel parts may be locked in their proper assembled position.

Since the flanges 25 snugly engage the rings 29 in the sockets S, and particularly since the rings 29 are square in cross section, providing fairly sharp corners, considerable tension may be imparted to the tread member 23 by the proper number of washers 38 so that the desired degree of compression or compaction of the soil may be secured when the wheel passes along the seed row, yet without any tendency for the tension in the tread section 23 to pull the flanges 25 around and off the rings 29. The substantially inextensible elements 26 prevent any stretching of the flanges 25.

While we have shown and described above the preferred structure in which the principles of the present invention have been incorporated, it is to be understood that our invention is not to be limited to the exact details, shown and described above, but that, in fact, widely different means may be employed in the practice of the broader aspects of our invention.

What we claim, therefore, and desire to secure by Letters Patent is:

1. A press wheel structure comprising a pair of separable rim sections, an annular tread member having marginal sections recessed to engage over the peripheral portions of said rim sections and a tread section of substantially uniform thickness extending between said recessed marginal sections, and means acting between said sections for holding the latter in spaced apart relation and thereby place the portions of uniform thickness of said tread member under axially directed tension.

2. A press wheel structure comprising a pair of separable rim sections, each including a ring member and a plurality of generally axially and inwardly extending peripherally spaced lugs, an annular tread member having marginal sections recessed to engage over the ring members of said sections, a hub carrying a wheel web section to which the inner ends of said lugs are adapted to be fixed, and means for fixing the inner ends of said lugs to said wheel web section and including means acting between said web section and at least certain of said lugs for imparting axially directed tension to said ring member.

3. A press wheel structure comprising a wheel having an open rim construction formed by a pair of axially spaced apart rings with an open space therebetween, and a resilient annular tread section comprising a substantially flat endless band having at each edge an inturned radially inwardly disposed flange, said flanges forming annular pockets for receiving, respectively, said rings.

4. A press wheel structure comprising a pair of spaced apart relatively movable rim sections, one being movable generally axially relative to the other, a resilient tread member adapted to encircle said rim sections, means for holding the edge portions of said tread member to said rim sections, respectively, the portions of said tread member between said rim sections being under axially directed tension, and means for holding said rim sections in axially spaced apart relation so as to retain said axially directed tension in said resilient tread member.

5. A press wheel structure comprising a pair of spaced apart, relatively movable rim sections, one being movable generally axially relative to the other, a resilient tread member adapted to encircle said rim sections, means for holding the edge portions of said tread member to said rim sections, respectively, whereby, when said rim sections are separated axially, generally axially directed tension is imparted to said resilient tread member, and means for holding said rim sections in axially spaced apart relation so as to retain said axially directed tension in said resilient tread member, said last mentioned holding means including lug means on said rim sections, and spacers cooperating with said lug means and disposed therebetween.

6. A press wheel structure comprising a pair of spaced apart, relatively movable rim sections, one being movable generally axially relative to the other, a resilient tread member adapted to encircle said rim sections, means for holding the edge portions of said tread member to said rim sections, respectively, whereby, when said rim sections are separated axially, generally axially directed tension is imparted to said resilient tread member, means for holding said rim sections in axially spaced apart relation so at to retain said axially directed tension in said resilient tread member, lug means on said rim sections extending generally radially and axially inwardly from said sections, and a wheel web section fixed between the lug means on one rim section and the lug means on the other rim section.

References Cited in the file of this patent

UNITED STATES PATENTS

| Number | Name | Date |
|---|---|---|
| 1,486,832 | Deady | Mar. 11, 1924 |
| 1,789,084 | Schwarz | Jan. 13, 1931 |
| 2,249,638 | Rietz | July 15, 1941 |
| 2,331,819 | West | Oct. 12, 1943 |
| 2,332,754 | Rietz | Oct. 26, 1943 |
| 2,601,464 | Tanke | June 24, 1952 |
| 2,606,486 | Klemm | Aug. 12, 1952 |